United States Patent Office 3,448,217

Patented June 3, 1969

3,448,217

TELEPHONE SETS

Hugh Spence Leman and George John Preston Barnes, London, England, assignors to International Standard Electric Corporation, New York, N.Y., a corporation of Delaware Continuation of application Ser. No. 456,703, May 18, 1965. This application Aug. 14, 1968, Ser. No. 754,110
Claims priority, application Great Britain, May 29, 1964, 22,299/64
Int. Cl. H04m *1/21*
U.S. Cl. 179—81 6 Claims

ABSTRACT OF THE DISCLOSURE

A hands-free loudspeaker set is provided. The gain of respective microphone and loudspeaker amplifiers is controlled by direction indicator equipment according to the direction of speech to or from a telephone line so that the appropriate amplifier is set to high gain while the other amplifier is set to reduced gain. A setting, once established, is held until there is a reversal of speech direction. If both parties talk at once, the fast operation of the direction indicator circuit makes it possible to switch syllables of one party between syllables of the other party giving a close approach to continuous two-way communication.

This is a continuation of application Ser. No. 456,703, filed May 18, 1965, now abandoned.

This invention relates to telephone sets, and particularly to loudspeaking telephone sets.

According to one aspect of the invention there is provided a loudspeaking telephone set, which includes a loudspeaker and a microphone both of which are connected via amplifiers to an input to the set, which input is connected to a two-way line when the set is in use, in which said set can be in a first condition in which the loudspeaker amplifier has a relatively high gain while the microphone amplifier has a relatively low gain or a second condition wherein the conditions of said amplifiers are the converse of said first condition, and in which direction indicating equipment is provided, which monitors the line when the set is in use, and controls the switching of the amplifiers to said first or said second conditions dependent on the current direction of signal flow in the line.

According to another aspect of the invention there is provided a loudspeaking telephone set including a loudspeaker amplifier, a microphone amplifier, a gain control circuit for said amplifiers, and a line signal direction indicator arranged to cause said gain control circuit to be set so as to increase the gain of said microphone amplifier and to reduce the gain of said loudspeaker amplifier when signals are transmitted to the line, and to be set so as to decrease the gain of said micophone amplifier and to increase the gain of said loudspeaker amplifier when signals are received from the line.

An embodiment of the invention will now be described with reference to the accompanying drawing, in which.

Figure 1:
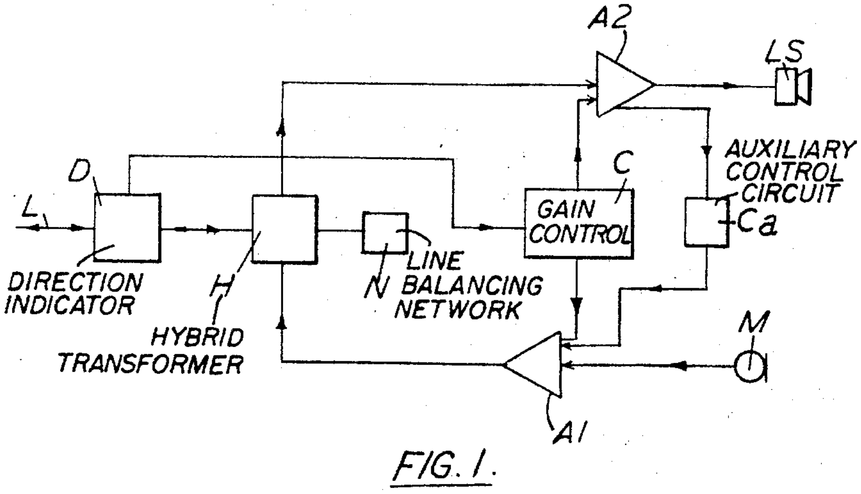
FIG. 1 is a block schematic diagram of a loudspeaking telephone set.

In FIG. 1, a microphone M and a loudspeaker LS are connected via amplifiers A1 and A2 respectively to a hybrid transformer H, to which is also connected a line balancing network N and a direction indicator D which in turn is connected to a two-way telephone line L.

The direction indicator D is capable of detecting the direction in which signals are travelling along the line.

There is a gain control circuit C for the amplifiers A1 and A2 controlled by the direction indicator D, and an auxiliary control circuit *Ca* for the microphone amplifier A1.

To explain the operation assume the set is switched to the receiving state, with the microphone amplifier A1 operating at attenuated gain and the receiving amplifier A2 at full gain. When speech signals originating at the microphone M are fed through the hybrid transformer H to the direction indicator D, and thence to the line L, the direction indicator D senses that signals are being transmitted to the line L and affects the control circuit C appropriately, so that the transmitting gain in amplifier A1 is increased to maximum and the receiver gain in amplifier A2 is decreased. The set is now in the transmitting state and remains so until signals are received from the line L.

Received signals pass through the direction indicator D in the opposite direction, with the result that the control circuit C causes the amplifier A2 to operate at full gain and the amplifier A1 at reduced gain. This is the receiving state, and throughout the period that the equipment is thus set, received signals operate the auxiliary control circuit *Ca* which further decreases the gain of the microphone amplifier A1 only while signals are received from the line. The reason for this is associated with the acoustic coupling between the microphone M and loudspeaker LS. Without this further decrease in gain, received signals appearing at the loudspeaker LS may be picked up by the microphone M and treated as transmitted signals causing the set to switch to transmit.

Acoustic delays associated with the room acoustics and separation between loudspeaker and microphone complicate the situation, and it has been found an advantage to to introduce some delay into this auxiliary control circuit *Ca*. This does not effect the main control of the set which may still operate in the shortest time.

Figure 2:
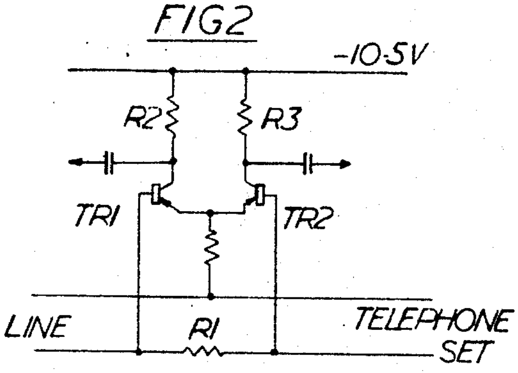
FIG. 2 is the basic circuit of a signal direction indicator.

Operation of the direction indicator may be simply explained with reference to the basic circuit in FIG. 2. Resistor R1 in series with the line circuit causes an attenuation of the signal coming from or going to the line. Considering a signal coming from the line, there will be an attenuation (—*a* db) from the base of transistor TR1 to the base of transistor TR2 due to R1. There will also be some attenuation from the base to emitter of TR1 and this attenuation is (—*b* db). Since the emitters of TR1 and TR2 are joined together, if attenuation (—*a* db) is equal to (—*b* db), there will be no signal between base and emitter of TR2, and hence no output across collector load resistance R3, but as there is a signal between base and emitter of TR1, it will be amplified and obtained across R2.

For signals travelling in the other direction, namely to the line, the position as regards signal amplification is reversed and TR2 has an output, TR1 has not.

Figure 3:
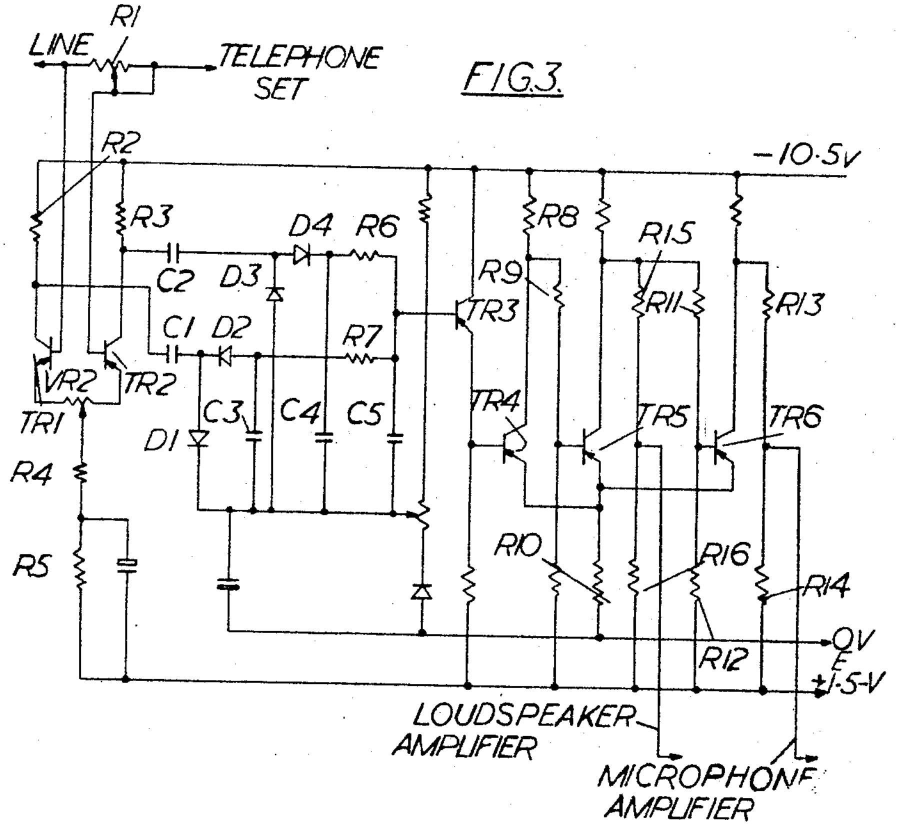
FIG. 3 is a circuit diagram of the signal direction indicator and a gain control circuit.

FIG. 3 shows the direction indicator and its associated gain control circuit.

The outputs from TR1 and TR2 are each taken to a voltage doubler rectifier circuit, comprising diodes D1, D2, D3 and D4 and capacitors C1, C2, C3 and C4, and the DC outputs smoothed and connected in parallel, but working in opposite polarities. In this way when signals are coming from the line, TR1 has an output and the resultant DC at the voltage doubler output is negative with respect to the slider of potentiometer VR1. For signals travelling in the reverse direction of the resultant output becomes positive. Direction of transmission is therefore denoted by a positive or a negative voltage appearing across capacitor C5, and this voltage is used to actuate the switching circuit, which in turn changes the gain of the amplifiers in accordance with the direction of transmission.

A convenient method of base bias is used for TR1 and TR2, whereby the base current is supplied along the DC path through the hybrid coil circuit, from the potential E of the "common" rail. The emitter resistors R4 and R5 are taken to a positive voltage of 1.5 volts. With bias supplied in this way, there is no need for capacitors to connect the bases of TR1 and TR2 to the series line resistor R1.

The arrangement of the voltage doubler outputs is such that in whichever direction signals are travelling, the gain of the transistor stages TR1 and TR2 are equal. In each case, the DC load on each voltage doubler is equal value resistors R6 and R7 in series. By ensuring that the capacitors C1 and C2 are of equal value, the AC loads on TR1 and TR2 are equal resulting in equal gains in each stage. Additional gain balance is afforded by potentiometer VR2.

It has been mentioned that the operation of the set is arranged so that once triggered into a particular state the control circuit must hold it in that state until it is directed by the direction indicator to trigger into the other state. This requirement involves the use of a bistable form of circuit for the switching function and one which must be sensitive to positive and negative DC voltages at the input. A Schmitt trigger circuit, if biased to a point between its two trigger voltages, will be triggered one way with a negative voltage, and in the reverse direction with a positive voltage. Returning its input to the bias point leaves the circuit in its last triggered state.

The circuit is shown in FIG. 3 and comprises transistors TR4 and TR5 with an emitter follower TR3 to drive it.

The Schmitt trigger circuit formed by TR4 and TR5 follows closely on conventional design. With no current into the base of TR4, TR5 conducts, drawing its base bias through resistors R8 and R9. The TR5 emitter current flowing through resistor R10, serves to bias TR4 nonconducting for all voltages at its base that are more positive than a certain critical voltage. This critical voltage is dependent on the voltage at the emitters and also on the base emitter voltage of TR4 at which base current will flow. Once the critical base voltage $V_{t1}$, at TR4 has been exceeded with a negative going voltage the circuit will remain triggered with TR4 fully conducting, until its base voltage has become more positive than a second critical voltage $V_{t2}$. This voltage $V_{t2}$ is slightly more positive than the $V_{t1}$, and the difference between them is influenced mainly by the difference in collector current drawn by TR4 and TR5 when each is fully conducting alone. This assumes the emitter of transistor TR6 connected to E.

TR6 emitter is in fact connected to the common connection between the emitters of TR4 and TR5. In this way the emitter currents of TR4 and TR6 combine through R10 as they become conducting simultaneously. Collector loads for these two transistors are chosen such that their combined load current nearly equals that of TR5. In this way the total load current drawn from the supply does not change appreciably as the circuit is switched, and the critical switching voltages $V_{t1}$ and $V_{t2}$ are brought closer together, giving greater sensitivity to DC input changes at TR4 base.

With the TR4 base voltage between $V_{t1}$ and $V_{t2}$ the state of the circuit may be either TR4 conducting, or TR5 conducting, and the emitter follower TR3 is adjusted such that the base voltage to TR4 is held normally between $V_{t1}$ and $V_{t2}$. A negative going voltage at the base of TR3 that causes the base of TR4 to become more negative than $V_{t1}$, will then trigger the circuit to TR4 conducting. The circuit will remain in this state even if the base voltage of TR4 returns to a level between $V_{t1}$ and $V_{t2}$. If a positive going voltage at the base of TR3 causes the base of TR4 to become more positive than $V_{t2}$ then the circuit will trigger to TR5 conducting, the circuit remaining in that state until the voltage at TR4 base becomes more negative than $V_{t1}$.

The Schmitt trigger circuit is in this way able to use the positive and negative potential from the direction indicator, to trigger into one of two states.

When transmitting signals to the line, the direction indicator delivers a positive going voltage to the base of TR3. Thus the Schmitt trigger circuit is triggered to TR5 conducting, its collector assuming a potential of about —0.7 volt. Between this collector and the +1.5 volt supply the potential divider, formed by resistors R11 and R12, drives the base of TR6 positive to make it nonconducting.

With TR6, now rendered nonconducting, its collector potential becomes about —9 volts, and the tapping on the potential divider formed by resistors R13 and R14 becomes negative. This negative potential is fed to the microphone amplifier to increase the gain of the amplifier to a maximum. Similarly the tapping on the potential divider formed by resistors R15 and R16 becomes positive as TR5 is triggered conducting. This latter potential is fed to the loudspeaker amplifier, reducing its gain.

When signals are received from the line the operation is reversed by the negative going potential at the base of TR3. TR4 is rendered conducting and TR6 conducting due to its base becoming negative. In this way a positive voltage is fed to the microphone amplifier, reducing its gain, and a negative potential is fed to the loudspeaker amplifier increasing its gain to maximum.

The state of the overall circuit, whether transmitting or receiving, is determined therefore by the state of the Schmitt trigger circuit which in turn is determined by the polarity of the last triggering voltage it received, which in turn again, is determined by signals travelling to or from the line.

By putting the directional indication equipment outside the local sidetone loop, and making its operation extremely fast, an almost instantaneous indication of the direction of signals is given, irrespective of the switched state of the set, and unaffected by the balance at the hybrid transformer. If both parties talk at once, the extremely fast operation of the indicator renders it possible to switch syllables of one party between syllables of the other, giving a close approach to continuous two-way communication.

It is to be understood that the foregoing description of specific examples of this invention is made by way of example only and is not to be considered as a limitation on its scope.

What is claimed is:

1. A loudspeaking hands-free telephone set having a loudspeaker and a microphone, input means for connecting said set to a two-way telephone line when said set is in use, first and second amplifier means for connecting said loudspeaker and said microphone respectively to said input means, gain control means for selectively varying the gain of said amplifier means between a first condition wherein said first amplifier has a relatively high gain while said second amplifier has a relatively low gain and a second condition wherein said second amplifier has a relatively high gain while said first amplifier has a relatively low gain, and a signal direction indicator means for operating said gain control means to said first condition responsive to signals coming from the line and to said second condition responsive to signals going to the line, said signal direction indicator means including two transistors having respective control electrodes connected to opposite end terminals of a resistor where said resistor is connected in series in said two-way telephone line so that a different one of said transistors is biased to conduction according to the direction of signals in the line.

2. A loudspeaking telephone set having a loudspeaker and a microphone including:

a loudspeaker amplifier and a microphone amplifier connected to said loudspeaker and to said microphone respectively, a gain control circuit for said amplifiers, and a line signal direction indicator located outside of the local sidetone circuit and arranged to cause said gain control circuit to be set to increase the gain of said microphone amplifier and to reduce the gain of said loudspeaker amplifier when signals are transmitted to a two-way telephone line, and to be set to decrease the gain of said microphone amplifier and to increase the gain of said loudspeaker amplifier when signals are received from the two-way telephone line, said signal direction indicator means including two transistors having respective control electrodes connected to opposite end terminals of a resistor where said resistor is connected in series in said two-way telephone line so that a different one of said transistors is biased to conduction according to the direction of signals in the line.

3. A loudspeaking telephone set as claimed in claim 2, and including:

an auxiliary gain control circuit arranged to be set to cause a further reduction in the gain of said microphone amplifier while signals are being received from the line.

4. A loudspeaking telephone set as claimed in claim 3, and including:

means for delaying the setting of said auxiliary gain control circuit.

5. A loudspeaking telephone set as claimed in claim 4, in which:

the gain setting established for one direction of transmission in the line is held until transmission occurs in the other direction.

6. A loudspeaking telephone set, comprising:

input means via which a two-way telephone line can be connected to the set, said input means including signal direction indicating equipment adapted to determine whether a signal on said line is an incoming or an outgoing signal, said signal direction indicator means including two transistors having respective control electrodes connected to opposite end terminals of a resistor where said resistor is connected in series in said two-way telephone line so that a different one of said transistors is biased to conduction according to the direction of signals in the line, a hybrid transformer to which said input means and a balancing network and two further lines are connected, a receiving amplifier connected by one of said further lines to said hybrid transformer and adapted to apply incoming signals in amplified form to a loudspeaker, a transmitting amplifier connected by the other of said two further lines to said hybrid transformer and adapted to apply outgoing signals in amplified form to said hybrid transformer, said transmitting amplifier receiving its signals from a microphone, a gain control circuit adapted to regulate the gain of said amplifiers under the control of said direction indicating equipment, said gain control circuit operating when said direction indicating equipment detects that a signal on said line is an outgoing signal to cause relatively high gain in said transmitting amplifier and relatively low gain in said amplifier, and said gain control circuit operating when said direction indicating equipment detects that a signal on said line is an incoming signal to cause relatively high gain in said receiving amplifier and relatively low gain in said transmitting amplifier, and an auxiliary gain control circuit operating when the signal is an incoming signal to further reduce the gain of said transmitting amplifier, said auxiliary gain control responding after the response of said gain control circuit.

References Cited

UNITED STATES PATENTS

| | | | |
|---|---|---|---|
| 3,136,864 | 6/1964 | Cleary | 179—81 |
| 3,027,429 | 3/1962 | Eklöv | 179—81 |
| 3,046,354 | 7/1962 | Clemency et al. | |
| 3,171,901 | 3/1965 | Clemency et al. | |
| 3,189,691 | 6/1965 | Simpson. | |
| 3,330,912 | 7/1967 | Koseki. | |

KATHLEEN H. CLAFFY, *Primary Examiner.*

R. P. TAYLOR, *Assistant Examiner.*

U.S. Cl. X.R.

179—1